United States Patent [19]

Kubota

[11] Patent Number: 4,464,818

[45] Date of Patent: Aug. 14, 1984

[54] PRESS-FIT DEVICE OF A DRIVE SHAFT INTO A DIFFERENTIAL GEAR OF A FRONT ENGINE-FRONT DRIVE TYPE AUTOMOTIVE VEHICLE

[75] Inventor: Hazime Kubota, Toyota, Japan

[73] Assignee: Toyota Jidosha Kabushiki Kaisha, Toyota, Japan

[21] Appl. No.: 448,060

[22] Filed: Dec. 9, 1982

[51] Int. Cl.³ .............................................. B23P 19/04
[52] U.S. Cl. ........................................ 29/252; 269/25; 269/46; 269/165; 269/71
[58] Field of Search .............. 29/237, 238, 252, 281.4; 269/46, 147, 148, 149, 25, 165, 71

[56] References Cited

U.S. PATENT DOCUMENTS

| | | | |
|---|---|---|---|
| 2,530,016 | 11/1950 | Landis et al. | 269/46 |
| 2,706,922 | 4/1955 | Allen | 269/25 |
| 2,947,275 | 8/1960 | Edmonds | 269/25 |
| 2,949,947 | 8/1960 | Story | 269/147 |
| 4,189,817 | 2/1980 | Moebius | 29/252 |

*Primary Examiner*—Robert C. Watson

*Attorney, Agent, or Firm*—Finnegan, Henderson, Farabow, Garrett & Dunner

[57] ABSTRACT

A press-fit device of a drive shaft into a differential gear installed in a front engine-front drive type automotive vehicle comprising a first mechanism for press-fitting a drive shaft and a Hooke's joint which are oppositely set to both sides of a differential gear and a second mechanism for retaining the first mechanism and adjusting the position of the first mechanism relative to the differential gear. The first mechanism is comprised of a cylinder fixedly provided with a first attachment at its one end and with a rod guide at its other end, a rod adapted to be reciprocatably inserted into the cylinder, being guided by the rod guide and having a stopper at its free end, a second attachment slidably fitted on the rod between the stopper and the rod guide, and a guide shaft provided in a parallel relation with the cylinder for guiding the movement of the second attachment. The first and the second attachments are adapted to abut against the end surfaces of the Hooke's joint and the drive shaft, respectively.

4 Claims, 2 Drawing Figures

4,464,818

PRESS-FIT DEVICE OF A DRIVE SHAFT INTO A DIFFERENTIAL GEAR OF A FRONT ENGINE-FRONT DRIVE TYPE AUTOMOTIVE VEHICLE

BACKGROUND OF THE INVENTION

This invention relates to a device for press-fitting a drive shaft and a Hooke's joint into a differential gear of a front engine-front drive type automotive vehicle.

Conventionally, in the case that a drive shaft and a Hooke's joint are press-fitted into the left and right sides of the differential gear, respectively, separate actuators for press-fit are situated at both sides of the differential gear. The separate actuators are provided with each attachment adapted to abut against the respective end surfaces of the drive shaft and the Hooke's joint and are also provided with a guide shaft for guiding each attachment. Further, both the attachments at the left side of the drive shaft and at the right side of the Hooke's joint are retained by separate floating mechanisms. Owing to this arrangement, the press-fit device is totally complicated, large in scale and costly, and further is difficult to operate.

SUMMARY OF THE INVENTION

Accordingly, an object of the present invention is to provide a press-fit device of a drive shaft into a differential gear, which is simple, compact and inexpensive, and also ready to operate.

Briefly, the present invention comprises a first mechanism for press-fitting a drive shaft and a Hooke's joint into a differential gear and a second mechanism for retaining the first mechanism and adjusting the position of the first mechanism relative to the differential gear. The first mechanism further comprises a cylinder fixedly provided with a first attachment at its one end and with a rod guide at its other end, a rod adapted to be reciprocatably inserted into the cylinder, being guided by the rod guide and having a stopper at its free end, a second attachment slidably fitted on the rod between the stopper and the rod guide, and a guide shaft provided in parallel relation with the cylinder for guiding the movement of the second attachment.

The object and feature of the invention may be understood with reference to the following detailed description of an illustrative embodiment of the invention, taken together with the accompanying drawings.

DETAILED DESCRIPTION OF THE PREFERRED EMBODIMENT

Figure 1:
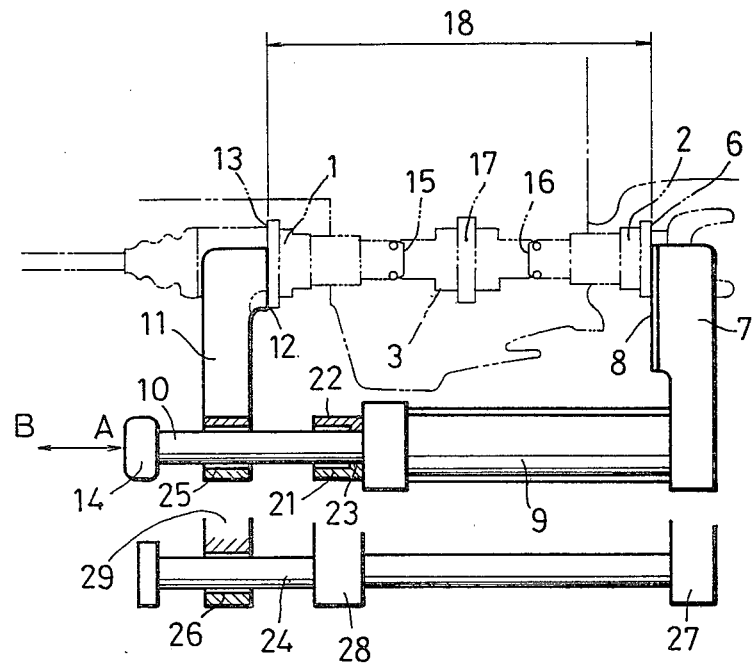
FIG. 1 is a plan view of the essential part of the preferred embodiment according to the present invention.

Referring now to FIG. 1, a drive shaft 1 is set to the left-hand side of a differential gear 3 by a serration and a Hooke's joint 2 is set to the right-hand side of the differential gear 3 by a serration. Reference numerals 15 and 16 designate free ends of the drive shaft 1 and the Hooke's joint 2, respectively. Reference numeral 17 designates a center pin of the differential gear 3. A press-fit mechanism 5 is comprised of a cylinder 9 fixedly provided with a first attachment 7 at its one end and with a rod guide 21 at its other end, a rod 10 adapted to be reciprocatably inserted into the cylinder 9, being guided by the rod guide 21 and having a stopper 14 at its free end, a second attachment 11 slidably fitted on the rod 10 between the stopper 14 and the rod guide 21, and a guide shaft 24 provided in parallel relation with the cylinder 9 by supports 27, 28 and 29 below the cylinder 9. The supports 27, 28 and 29 are integrally fixed to the first attachment 7, the rod guide 21 and the second attachment 11, respectively. The rod guide 21 is provided with a bearing 22 for effecting the smooth sliding motion of the rod 10 and an oil seal 23 for preventing oil leakage from the cylinder 9. The second attachment 11 and the support 29 are provided with bearings 25 and 26 for effecting the smooth sliding motion of the rod 10 and the guide shaft 24, respectively. The guide shaft 24 is fixed to the supports 27 and 28.

Figure 2:
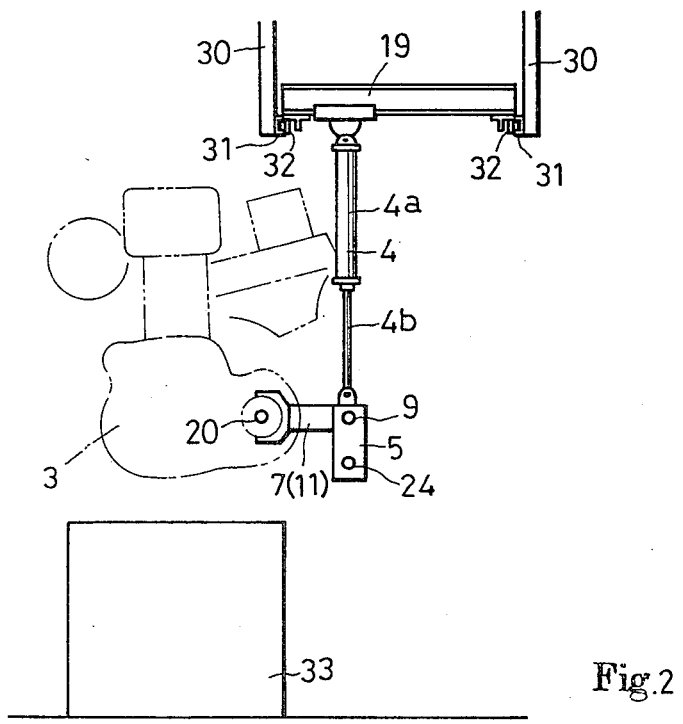
FIG. 2 generally illustrates a side view of the preferred embodiment according to the present invention.

As shown in FIG. 2, parallel rail receiving members 30 are provided with rails 31 and a cross bar 19 is mounted on the rails 31 through rollers 32 and is adapted to move forwardly and rearwardly. The cross bar 19 is provided with a balancer 4 including a hydraulic cylinder 4a and a rod 4b. The balancer 4 is adapted to move rightwardly and leftwardly along the cross bar 19. The press-fit mechanism 5 is provided at the lower end of the rod 4b and is adapted to move upwardly and downwardly in association with the reciprocation of the rod 4b. Accordingly, the press-fit mechanism 5 is capable of moving forwardly and rearwardly, upwardly and downwardly, and rightwardly and leftwardly relative to the differential gear 3. Reference numeral 20 designates a center of the differential gear 3.

In operation, the cross bar 19 is manually moved forwardly or rearwardly and the rod 4b of the balancer 4 is moved upwardly or downwardly to bring the face 8 of the first attachment 7 into contact with the end surface 6 of the Hooke's joint 2, so as to set the press-fit mechanism 5 to the drive shaft 1 and the Hooke's joint 2 which are preset to the differential gear 3 by serration. Then, the second attachment 11 is slided along the rod 10 to bring the face 12 of the attachment 11 into contact with the end surface 13 of the drive shaft 1 to complete the setting of the press-fit mechanism 5 on the differential gear 3.

Upon pushing a start button (not shown) for press-fit operation, the rod 10 is retracted in the direction depicted by an arrow A and the stopper 14 abuts against the attachment 11. At the same time, the drive shaft 1 and the Hooke's joint 2 are forced to begin press-fitting into the differential gear 3. The pressure of the press-fit mechanism 5 is transmitted from the stopper 14 through the attachment 11 to the drive shaft 1, which is in turn press-fitted into the differential gear 3. At the same time, a reactive force of the pressure is applied to the Hooke's joint 2 through the attachment 7 and the Hooke's joint 2 is press-fitted into the differential gear 3. The amounts of press-fitting the drive shaft 1 and the Hooke's joint 2 into the differential gear 3 are determined in such a manner that the free end 15 of the drive shaft 1 and the free end 16 of the Hooke's joint 2 reach the center pin 17 of the differential gear 3 and at the time of completion of the press-fit operation, the distance 18 between the end surface 13 of the drive shaft 1 and the end surface 6 of the Hooke's joint 2 is measured by a sensor and is compared to the designated value within the standard. After the determination is finished, the rod 10 of the press-fit mechanism 5 is advanced in the direction depicted by an arrow B up to the original position, wherein the pressure acting on both the attachments 7 and 11 is released. When the rod 10 is returned to the original position, the press-fit mechanism 5 is manually released from the work or the differential gear 3 press-fitted with the drive shaft 1 and the Hooke's joint 2. In such a manner as hereinabove described, the press-fit operation is completed.

Although only one embodiment of the invention has been disclosed and described, it is apparent that other embodiments and modifications of the invention are possible.

What is claimed is:

1. A press-fit device of a drive shaft into a differential gear of a front engine-front drive type automotive vehicle comprising, a first mechanism for press-fitting a drive shaft and a Hooke's joint which are oppositely set to both sides of the differential gear and a second mechanism for retaining said first mechanism and adjusting the position of said first mechanism relative to said differential gear; said first mechanism being comprised of a cylinder fixedly provided with a first attachment at its one end and with a rod guide at its other end, a rod adapted to be reciprocatably inserted into said cylinder, being guided by said rod guide and having a stopper at its free end, a second attachment slidably fitted on said rod between said stopper and said rod guide, and a guide shaft provided in parallel relation with said cylinder for guiding the movement of said second attachment; said first and second attachments being adapted to abut against the end surfaces of said Hooke's joint and said drive shaft, respectively.

2. A press-fit device as defined in claim 1, wherein said guide shaft is fixedly mounted on two supports integrally formed with said first attachment and said rod guide on the lower parts of said first attachment and said rod guide, respectively and slidably mounted on a support integrally fixed to said second attachment on the lower part thereof.

3. A press-fit device as defined in claim 1, wherein said second mechanism for retaining said first mechanism comprises a cross bar movably mounted on and along rails and a balancer mounted on at its upper end and movable along said cross bar, said first mechanism being attached to the lower end of said balancer.

4. A press-fit device as defined in claim 3, wherein said balancer comprises a hydraulic cylinder and a rod reciprocably inserted in said cylinder.

* * * * *